INVENTORS
RAYMOND BIRD
JOHN ROBERT CARTWRIGHT
BY
Hane and Nydick
ATTORNEYS

3,063,042
DATA STORAGE SYSTEMS

Raymond Bird and John Robert Cartwright, Letchworth, England, assignors to International Computers and Tabulators Limited, London, England Original application Dec. 1, 1954, Ser. No. 472,453, now Patent No. 2,958,856, dated Nov. 1, 1960. Divided and this application May 17, 1960, Ser. No. 29,616
9 Claims. (Cl. 340—174.1)

Figures 1, 1A, 2, 2A:
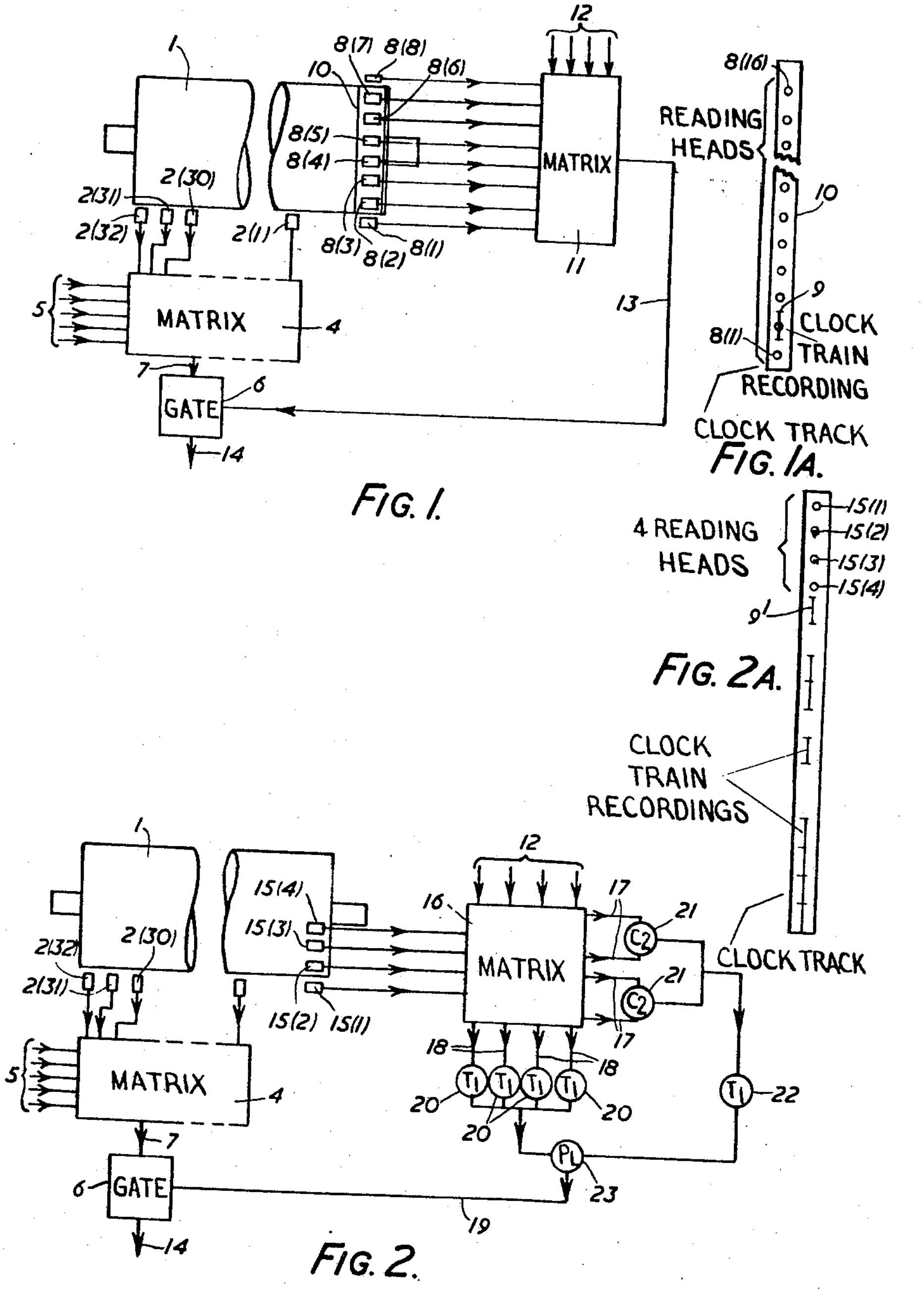

This invention relates to data storage systems using a rotating member, such as a drum or disc, which has a magnetisable surface.

This is a division of application Serial No. 472,453, filed December 1, 1954, now Patent No. 2,958,856, entitled "Magnetic Data Storage Systems" and assigned to the assignee of the present invention.

It is well known to employ a magnetic drum or disc for data storage in computing machines and similar applications. The data is recorded in a plurality of tracks around the periphery, each track containing several "words" or items of data. A clock track is usually provided to generate timing signals corresponding to each pulse position of each word, for gating signals for both reading and writing on the drum. In order to select a particular position on the drum for reading or writing, it has been the practice to use a combination of space selection and time selection. The space selection consists in selecting the head associated with the track containing the particular word position. This selection may be performed by a switching network of relay contacts or valves alone, or such a network acting in conjunction with a physical movement of a limited number of heads. The time selection is performed by making the selected head operative to read or write, as the case may be, at some selected interval after a reference point on the drum passes the selected head. This has been done, for example, by providing an end of revolution pulse and an end of word pulse, counting the end of word pulses and determining coincidence between the counter and the number of the particular word position.

It is the object of the present invention to provide a simplified method for the selection of a desired word position on a magnetic drum or disc storage device, having a plurality of tracks, each containing a plurality of words.

According to the invention data storage apparatus includes a rotatable magnetic storage member with a data storage track providing a plurality of word storage areas, a transducing head cooperating with the data track, signal gating means for the transducing head, a clock pulse track on the storage member divided into word areas corresponding to said word storage areas, a group of clock pulse signals recorded in at least one of said clock pulse word areas and others of the clock pulse word areas being blank, a plurality of reading heads spaced apart at word intervals along the clock pulse track and cooperating with said recorded clock pulse signals to generate a train of clock pulses for each word storage position, and switching means interconnecting said plurality of reading heads and said gating means and settable to apply to the gating means that clock pulse train which corresponds to a selected one of said word storage areas.

The invention will now be described, by way of example, with reference to the accompanying drawing, in which:

FIGURE 1 is a schematic block diagram of one embodiment of the invention;

FIGURE 1*a* is a schematic illustration of a clock track and the associated reading heads;

FIGURE 2 is a schematic block diagram of another embodiment of the invention, and FIGURE 2*a* is a schematic illustration of a clock track of the embodiment of FIGURE 2.

By way of illustration, it will be assumed that it is required to read out a selected word from data already recorded on a magnetic storage drum 1 (FIGURE 1). There are thirty-two data tracks from which data may be read by thirty-two reading heads 2(1) to 2(32), of which four heads are shown. Each track contains sixteen word recording areas, each of which contains thirty-two binary digits.

The word to be selected is that word which is recorded in the thirty-first track sensed by head 2(31) and which is recorded in the second word area starting from a given reference point on the magnetic drum 1.

The first selection operation is, therefore, that of selecting the head 2(31). This is effected by a switching matrix 4 which connects the head to a single output line 7. The switching matrix is controlled by the potentials on five lines 5 which are energised singly or in combination to select any one of the thirty-two heads. The matrix may consist of a network of the contacts of relays controlled by the lines 5 or of diodes or multi-electrode valves, according to other circuit requirements, such as the maximum speed at which the matrix has to be switched. Switching matrices of this general type are well known, and are described for example in a paper entitled "Rectifier Networks for Multi-Position Switching" by D. R. Brown and N. Rochester appearing at pages 139 to 147 of vol. 37, No. 2 of Proc. I.R.E. (February 1949).

A clock track 10 is provided on the drum 1 and sixteen clock track reading heads 8 are arranged adjacent to this track circumferentially around the drum 1, the heads being spaced at one word intervals. A single group 9 (FIG. 1*a*) of thirty-two clock pulses is recorded on the clock track at such a position that it is being read by the head 8(1) at the same time as the first word of each data track is being read by the corresponding head 2.

Since the heads 8 are spaced apart at one word intervals, it follows that the head 8(1) will produce a train of thirty-two clock pulse signals coincident with the thirty-two digit positions of the first word in each data track, the head 8(2) will produce a train of thirty-two clock pulse signals coincident with the second word, and so on. The single group 9 of recorded clock pulses will be read in turn by all the heads 8 during one revolution of the drum 1, so that sixteen trains of clock pulses are generated, corresponding to the sixteen word positions in a data track.

The output signals from the heads 8 are fed to a switching matrix 11, which is similar to the matrix 4 except that only four control lines 12 are needed to effect selection of any one of the sixteen heads. The output from the matrix 11 is fed to a gating and amplifying circuit 6, which also receives the output from the matrix 4 over line 7. The circuit 6 may be of any conventional form, such as one of those shown at pages 37 to 40 of "High Speed Computing Devices," published by the McGraw-Hill Book Company in 1950.

Summarising the operation of reading out a selected word from a selected data track, the lines 5 are selectively energised so that the required one of the heads 2 is selected by the matrix 4 to read out signals to the line 7. At the same time, the lines 12 are selectively energised to allow the clock pulse train from the required one of the heads 8 to appear on the line 13. In the present example, the matrix 4 will be operated to connect the head 2(31) to the line 7, and the matrix 11 will be operated to connect the head 8(2) to the line 13. Thus, all the data signals sensed serially by the head 2(31) will be fed to the circuit 6, via the line 7, but the head 8(2)

will feed clock pulse signals to that circuit only during the time that the second word is being sensed from the data track. Consequently, only the data signals forming the second word will appear on output line 14 of the circuit 6.

If the words are very closely spaced along the tracks, it may not be possible to mount the heads 8 sufficiently close together to provide the required one word spacing. In this case two clock tracks may be used, each having one word recorded thereon, and the heads are then mounted so that the heads 8(1), 8(3), 8(5) etc., read one clock track and the heads 8(2), 8(4), 8(6) etc. read the other clock track.

In the embodiment of the invention shown in FIGURE 2, a single clock track is used, and this track is read by four heads 15(1), 15(2), 15(3) and 15(4) arranged circumferentially around the drum 1, with the heads spaced at one word intervals. A pattern of clock pulse word groups $9^1$ (FIGURE 2*a*) is recorded on the clock track such that for each data word position a different combination of clock track heads is reading a word group. One example of such a pattern is shown below. An "X" indicating that a word is recorded in that position.

| Data word position | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| Clock word group | X | X | X | X | — | — | X | — | X | X | — | X | — | — | — | — |

Using this pattern, the data word positions at which each clock pulse head read a word group is shown below, and it will be seen that a unique combination of heads are utilised for each of the sixteen positions.

| Data word position | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| Head 15(1) | X | X | X | X | — | — | X | — | X | X | — | X | — | — | — | — |
| Head 15(2) | — | X | X | X | X | — | — | X | — | X | X | — | X | — | — | — |
| Head 15(3) | — | — | X | X | X | X | — | — | X | — | X | X | — | X | — | — |
| Head 15(4) | — | — | — | X | X | X | X | — | — | X | — | X | X | — | X | — |

The lines 12 now control a matrix 16 which switches the four heads to one of two sets of output lines 17 and 18, depending upon whether the head is inoperative or operative for the data word position required. The matrix 16 is of known kind and is disclosed in the above-mentioned paper "Rectifier Networks for Multiposition Switching." For example, for the ninth word position, the heads 15(1) and 15(3) are connected to the first and third output lines 18 and the heads 15(2) and 15(4) are connected to the second and fourth output lines 17.

The lines 17, 18 which are not connected to the heads are connected to a constant voltage. The lines 17, 18 are connected to a circuit, the function of which is to gate to the circuit 6 on line 19 clock pulses only during the word position selected by the setting of matrix 16. This circuit embodies a number of switching elements illustrated on page 12 of "Synthesis of Electronic Computing and Control Circuits" published by Harvard University Press and represented by the same reference letters $T_1$, $C_2$, $P_2$, used on that page. Thus the lines 18 are connected to four $T_1$ switching elements 20 having a common output circuit as illustrated at the sixth line of page 12 of the before-mentioned book, and forming a four-input "and" gate.

Each element 20 which is not connected to a head by matrix 16 is switched on by the constant voltage. An output pulse will therefore be emitted, when and only when pulses are received simultaneously on the lines 18 which are connected to heads.

The lines 17 are connected in pairs to two two-input gates 21, the output from which are commoned and A.C. coupled through an inverter 22 to a two-input "and" gate 23. The output from gate 20 is also applied to gate 23 and the output on gate 23 is applied on line 19 to the device 14.

Inverter 22 normally provides a priming voltage for gate 23 so that if a pulse is emitted by gate 20 there will be an output on line 19.

However, the occurrence of a pulse on any line 17 connected by the matrix 16 to a head will cause a pulse to pass to the inverter 22 and will prohibit an output from gate 23. As an example, suppose the matrix 16 is set for the ninth word position; clock pulses will then only be passed by gate 23 when simultaneously there are pulses on the first and third lines 18, so as to operate gate 20, and when there are no pulses on the second and fourth lines 17 so that no pulse is emitted by gates 21. From an examination of the table it will be seen that these circumstances occur only during the ninth data word position.

The circuit of FIGURE 2 will not give clock pulses for the sixteenth word position since, as the table shows, no heads are connected to lines 18.

If it is essential to use the sixteenth word position, this may be arranged by providing a second clock track having words of thirty-two pulses recorded in all the sixteen positions. The circuit associated with lines 18 is modified to provide a control voltage except when a head connected to it is inoperative or the circuit associated with lines 17 is operative. This control voltage is applied to a gate which also receives pulses from the head reading the second clock track. The output of this gate is fed to the circuit 6 instead of the output from the circuit associated with lines 18.

It will be appreciated that the arrangements described are equally applicable to recording on the drum in a chosen word position if the circuit 6 is modified so that a pulse applied to the line 14 produces an output on the line 7 if this pulse coincides with a clock pulse on the line 13, or the line 19.

With the arrangement of FIGURE 2, other patterns of clock pulse words may be used with the heads in the relation shown, and the heads may also be spaced at other multiples of a word interval. The only requirement is that the heads must provide a unique coding of outputs for each data word position which is to be selected.

It will be appreciated that the arrangement of the clock tracks for each form of the invention is dependent solely upon the number of word positions in a data track and the number of digits in each word. Consequently, the clock tracks need not be recorded on the drum itself; instead they may take the form of phonic wheel pulse generators, mounted on the same shaft as the drum, and associated with suitable pick-up or reading heads. Alternatively, a disc with alternate transparent and opaque sections may be mounted on the drum shaft and sensed photo-electrically to produce the required clock pulse trains.

It has been explained how the selection of one data transducing head and one clock track reading head enables a selected data word to be read out. It will be apparent that neither selection involves the use of circuits which have to operate synchronously with the clock pulse timing, so that the selection circuits can work at relatively slow speed and the switching matrices may be controlled by signals which are not synchronous with the rotation of the drum.

We claim:

1. Data storage apparatus including a rotatable magnetic storage member with a data storage track providing a plurality of word storage areas; a transducing head cooperating with all the storage areas of the data track; signal gating means for the transducing head; a clock pulse track on the storage member divided into word areas corresponding to said word storage areas, a group of clock pulse signals being recorded in at least one of said clock pulse word areas and others of the clock pulse word areas being blank; a plurality of reading heads spaced apart at word intervals along the clock pulse track and cooperating with said recorded clock pulse signals to generate trains of clock pulses corresponding to the word storage areas; word selecting static switching means interconnecting said plurality of reading heads and said gating means; and means for applying to the switching means address signals representing a required word storage area, said switching means operating in response to the application of said address signals to apply to the gating means only that clock pulse train which corresponds to said required word storage area, said gating means then being opened in response to the applied clock pulse train only while said transducing head is cooperating with said required word storage area.

2. Data storage apparatus comprising a multi-track, multi-word rotatable first magnetic storage means having a plurality of parallel data tracks, each track containing a plurality of successive word storage areas, a transducing head for each said data track for serially transducing signals corresponding to said successive word storage areas on the respective tracks, track selecting means for rendering operative one of said transducing heads, second magnetic storage means synchronously rotatable with said first storage means and having recorded thereon a clock pulse train corresponding to a single word storage area, a plurality of read-out heads mounted adjacent said second storage means and spaced round said second storage means at word intervals, word selecting means for rendering operative one of said read-out heads, gating means for all said transducing heads, and means controlled by the pulses read out by said one of said read-out heads for opening said gating means to render said one of said transducing heads effective only during the passage of the selected word storage area.

3. Data storage apparatus comprising a multi-track, multi-word rotatable first magnetic storage means having a plurality of parallel data tracks, each track containing a plurality of successive word storage areas, a transducing head for each said data track for serially transducing signals corresponding to said successive word storage areas on the respective tracks, track selecting means for rendering operative one of said transducing heads, second magnetic storage means synchronously rotatable with said first storage means and having recorded thereon a plurality of serial clock pulse trains each corresponding to a single word storage area positionally arranged in a single clock track in accordance with a predetermined code, a plurality of read-out heads located in co-operative relation to said track and in spaced relation to one another, first and second control means, second selecting means for selectively connecting at least some of said read-out heads to said first control means according to the word position to be selected and for connecting the remaining heads to said second control means, read-out means controlled jointly by said first and second control means for reading out a clock pulse train in a time position corresponding to said selected word position, gating means for said transducing heads, and means controlled by said read-out means for opening said gating means to render said one of said transducing heads effective only at the time when the selected word position passes said one of said transducing heads.

4. Data storage apparatus as claimed in claim 2, in which said track selecting means and said word selecting means each comprise a switching matrix.

5. Data storage apparatus as claimed in claim 3, in which said track selecting means and said second selecting means each comprise a switching matrix.

6. Data storage apparatus including a rotatable magnetic storage member with a data storage track providing a plurality of word storage areas; a transducing head aligned with said data track; signal gating means connected to the transducing head; a clock pulse track with clock pulse signals recorded therein; a plurality of clock pulse reading heads aligned with the clock pulse track and spaced apart along said track at equal intervals; and a switching network with a plurality of input lines, one connected to each clock pulse reading head, a single output line connected to said signal gating means, and a plurality of control lines, the switching network being responsive to different word area selecting combinations of potentials applied to the control lines to provide connections between the output line and different selected ones of the input lines, such that for each combination of control potentials a group of clock pulses corresponding to a different one of said data word areas appears on said output line, said gating means being responsive to the output clock pulse group to render the transducing head effective during the passage of the selected word area.

7. Data storage apparatus including a rotatable magnetic storage member with a plurality of data storage tracks, each providing a plurality of word storage areas; a transducing head cooperating with each data track; a first switching network having an individual input line connected to each transducing head, a single output line, and a plurality of control lines, the switching network being responsive to potentials applied to said control lines to connect a selected one of said input lines to the output line; a clock pulse track on said member with a single group of clock pulse signals corresponding to a data word recorded therein; a plurality of clock pulse reading heads spaced apart at equal intervals along the clock pulse track and cooperating therewith to generate a train of clock pulse signals corresponding to each word position in a data storage track; a second switching network having an individual input line connected to each of said clock pulse reading heads, a single output line, and a plurality of control lines, said second switching network being responsive to potentials applied to said control lines to connect a selected one of said input lines to said output line; and a signal gating circuit connected to both said output lines.

8. Data storage apparatus including a rotatable magnetic storage drum with a plurality of data storage tracks, each providing a plurality of word storage areas; a transducing head cooperating with each data track; a first switching network having an individual input line for each transducing head, a single output line, and a plurality of control lines, the switching network being responsive to different combinations of potentials applied to the control lines to connect different ones of the input lines to the output line; a plurality of clock pulse reading heads spaced apart at equal intervals along a clock pulse track on said storage drum, the clock pulse track having a plurality of groups of clock pulses recorded therein, and so arranged that a unique combination of reading heads are reading groups of clock pulses for each different data word area of a data track; a second switching network having an input line for each said reading head, a single output line and a plurality of control lines, said second switching network being responsive to a selected one of a number of different combinations of potentials respectively uniquely representing different word storage areas of a track, applied to said control lines to pass that group of clock pulses related to the word storage area represented by the selected combination to said output line; and a signal gating circuit connected to both said output lines and opened by signals carried thereby.

9. Data storage apparatus including a rotatable magnetic storage member with a data storage track providing a plurality of word storage areas; a transducing head cooperating with each of the storage areas in succession; signal gating means for the transducing head having a data transmission line; a clock pulse track on said storage member divided into word areas corresponding to said word storage areas, said clock pulse track carrying clock pulses recorded thereon according to a predetermined pattern; a plurality of reading heads spaced apart at word intervals along the clock pulse track and cooperating with the recorded clock pulse signals according to a predetermined code to generate groups of clock pulses corresponding to the word storage areas; a group of control lines; a static switching network connected to said group of control lines and having an output line, said network being responsive to address signals representing a required word storage area applied over the control lines to pass a selected group of clock pulses corresponding to only the required word storage area over said output line; and means connecting said output line to said signal gating means, the signal gating means being opened by the selected clock pulse group to render the transducing head operative to transfer data between the data transmission line and that word storage area represented by the address signals.

References Cited in the file of this patent

UNITED STATES PATENTS 2,771,595 Hendrickson et al. ------ Nov. 20, 1956